2,280,558

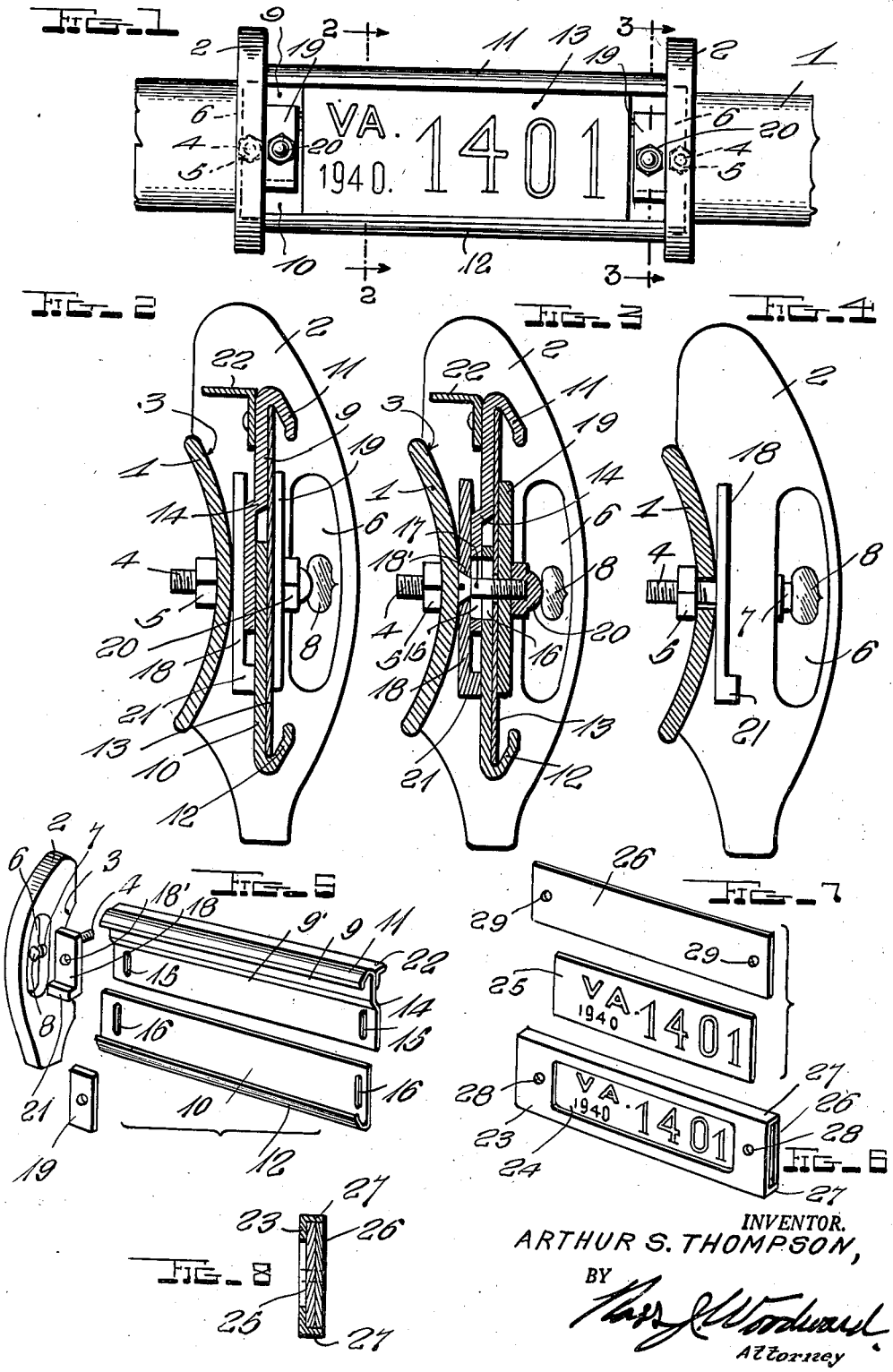
April 21, 1942.  A. S. THOMPSON  2,280,558
BUMPER AND LICENSE PLATE HOLDER
Filed Nov. 6, 1940
INVENTOR.
ARTHUR S. THOMPSON,
BY
Attorney Patented Apr. 21, 1942

UNITED STATES PATENT OFFICE 2,280,558

BUMPER AND LICENSE PLATE HOLDER

Arthur S. Thompson, Ontario, Calif.

Application November 6, 1940, Serial No. 364,589

7 Claims. (Cl. 40—130)

This invention relates to an improved license plate holder and it is one object of the invention to provide a device of this character which is particularly adapted to be applied to the bumper of an automobile and cooperate with the bumper to assist in withstanding shocks as well as serving to hold a license plate.

Another object of the invention is to provide a license plate holder wherein the end blocks of the holder are of thick metal capable of withstanding severe shocks received when one automobile strikes another.

A further object of the invention is to so form the end blocks that they may serve as holders for light bulbs and direct light rays from the bulbs onto a license plate mounted between the end blocks.

A further object of the invention is to provide a device of this character having upper and lower sections mounted between the end blocks in such manner that they may be adjusted and accommodate themselves to the dimensions of a license plate.

A still further object of the invention is to so form the upper and lower sections that when a license plate is applied, it will fit flat against the sections and have its upper and lower edge portions overlapped by flanges serving as retainers therefor.

Still another object of the invention is to so form the end blocks and the upper and lower license plate engaging members that they may be firmly secured in assembled relation to each other and the blocks securely fastened to the bumper.

And the invention has as a still further object to provide a license plate holder which is simple in construction, strong and durable, and very easy to apply.

In the accompanying drawing:

Fig. 1 is a front elevation showing the improved license plate holder mounted on a bumper.

Fig. 2 is a sectional view on an enlarged scale, on the line 2—2 of Fig. 1.

Fig. 3 is a similar view on the line 3—3 of Fig. 1.

Fig. 4 is a view looking at the inner side face of one end block with the bumper in section.

Fig. 5 is a perspective view showing the license plate holder disassembled with one end block omitted.

Fig. 6 is a perspective view of a modified form of the invention.

Fig. 7 is a view of the license plate and a backing plate removed from Fig. 6.

Fig. 8 is a sectional view taken transversely through Fig. 6.

The bumper 1 is a conventional bar bumper which may extend across the front or rear of an automobile for the full width thereof or for only a portion of its width. Bumpers of this type carry reinforcing clips or guards 2 which, in the present invention, constitute end blocks for the license plate holder, and referring to Fig. 4, it will be seen that each block 2 has the intermediate portion 3 of its rear edge curved to fit snugly against the curved surface of the bumper where it is secured by a threaded stem 4 passed through the bumper and secured by a nut 5. One or both of the blocks 2 is formed with a recess 6 opening through its inner face and housing a socket 7 in which is mounted a light bulb 8. Light will thus be thrown upon a license plate mounted between the end blocks and the license plate illuminated so that it may be clearly seen at night. Blocks constituting elements of a license plate holder to be mounted at the front of an automobile, need not be formed with the pockets or recesses, as the license plate at the front of an automobile does not have to be illuminated.

Between the end blocks extends a carrier which, in the preferred embodiment of the invention consists of upper and lower sections 9 and 10. These sections are formed of metal and have hook-shaped flanges 11 and 12 along their outer side edges for overlapping upper and lower edge portions of a license plate 13 and holding the license plate in flat contacting face to face engagement with the two sections. This is clearly shown in Figs. 2 and 3, and referring to these figures, it will be seen that the section 9 is bent, as shown at 14, to dispose its upper and lower portions in offset relation to each other and thus permit the lower section 10 to have its upper portion disposed in overlapping relation to the lower portion 9' of section 9 and still have the outer faces of the section 10 and the upper portion of section 9 in a common plane for engagement by the license plate. The end portions of the upper and lower sections are formed with slots 15 and 16 to receive securing bolts 17 which pass through openings 18' formed in ears or flanges 18 which project from inner side faces of the end blocks 2, and when the clamping plates 19 are applied to the bolts and cap nuts 20 applied and tightened, the two sections 9 and 10 will be firmly secured in their set positions and the license plate will be firmly held in place. The lugs 21 which project forwardly are of a thickness corresponding to the thickness of the metal from which the upper section 9 is formed and cause the lower portion of the lower section to be supported in the plane of the lower portion of the upper section, as shown in Figs. 2 and 3. It will thus be seen that license plates of different sizes may be applied to the holder and that when new plates are obtained, the ones to be discarded may be easily removed and the new plates set in place and secured. The strip 22 of angle metal which is secured along the upper edge portion of the upper section serves as a trim and adds to the appearance of the plate holder.

Instead of using the sectional plate holder shown in Figs. 2 through 5, the plate holder shown in Figs. 6, 7 and 8, may be employed. This plate holder consists of a frame 23 of dimensions adapting it to receive a license plate of standard dimensions. A display opening 24 is formed through the frame 23 to expose the license plate 25, and a backing plate 26 is provided to serve as a shield for the rear face of the license plate. The license plate and the backing plate fit snugly between the upper and lower flanges 27 of the frame and openings 28, and 29, which register, as shown in Fig. 8, are formed through the frame and the plate 26 to receive fastener bolts for securing the device to the ears 18 of the end blocks. When this form of holder is in use, the lugs 21 will be removed to permit the backing plate to have flat contacting engagement with the ears.

Having thus described the invention, what is claimed is:

1. In combination with a vehicle bumper, a license plate holder comprising end blocks disposed vertically and secured against the outer face of the bumper, ears extending laterally from the inner side faces of said end blocks, a frame for holding a license plate detachably secured to said ears and open at its front for displaying a license plate carried by the frame, and illuminating means carried by the end blocks.

2. In combination with a vehicle bumper, a license plate holder comprising end blocks disposed vertically and secured against the outer face of the bumper, ears extending laterally from the inner side faces of said end blocks, a plate carrying frame extending between the end blocks and secured against said ears, inner side faces of the end blocks being formed with pockets, and sockets mounted in the pockets of the end blocks for carrying bulbs to illuminate a license plate carried by the frame when energized.

3. A license plate holder comprising end blocks adapted to be secured to an automobile bumper, members extending laterally from inner side faces of the blocks, a frame for carrying a license plate extending between the end blocks, and fasteners extending through the members and portions of the frame to detachably secure the frame to the members.

4. A license plate holder comprising end blocks having their rear edge faces recessed to receive an automobile bumper, fasteners extending from the recesses for passing through a bumper and detachably securing the blocks thereto, ears extending from inner side faces of the blocks, the inner side faces of the blocks being formed with pockets, bulb-receiving sockets in said pockets, a frame for carrying a license plate extending between the blocks, and fasteners detachably securing end portions of the frame to said ears.

5. A license plate holder comprising end blocks adapted to be secured against a bumper, ears extending from inner side faces of the blocks, a frame for carrying a license plate extending between said blocks, and consisting of upper and lower sections formed with flanges along their outer side edges for engaging upper and lower edge portions of a license plate, said sections having their inner side portions overlapped and formed with registering slots, and bolts passing through the ears and through the registering slots of said sections to secure the frame against the ears and permit shifting of the sections toward and away from each other when loosened.

6. A license plate holder comprising end blocks adapted to be secured against a bumper, ears extending from inner side faces of the blocks, a frame for carrying a license plate extending between said blocks and consisting of upper and lower sections formed with flanges along their outer side edges for overlapping engagement with upper and lower edge portions of a license plate disposed against the sections between the flanges, said sections having their inner side portions overlapped and formed with registering slots extending vertically, one section having its overlapped portion offset inwardly and in flat contacting engagement with the ears, said ears having end lugs constituting abutments for the other section, bolts passed outwardly through the ears and the registering slots of said sections, clamping plates upon outer portions of the bolts, and nuts threaded upon the outer end portions of the bolts for engaging the clamping plates and releasably holding same in tight clamping engagement with a license plate in the frame.

7. A license plate holder comprising end blocks adapted to be secured against a bumper, ears extending from inner side faces of the blocks, a frame for carrying a license plate extending between said blocks and formed with an opening and rearwardly extending upper and lower flanges, a license plate in the frame displayed through the opening, a backing plate in the frame against the rear face of the license plate, and securing bolts passing through the ears and ends of the frame and the plates.

ARTHUR S. THOMPSON.